June 12, 1951     J. C. KREJCI     2,556,196
PROCESS AND APPARATUS FOR PRODUCING CARBON BLACK
Filed Nov. 6, 1944
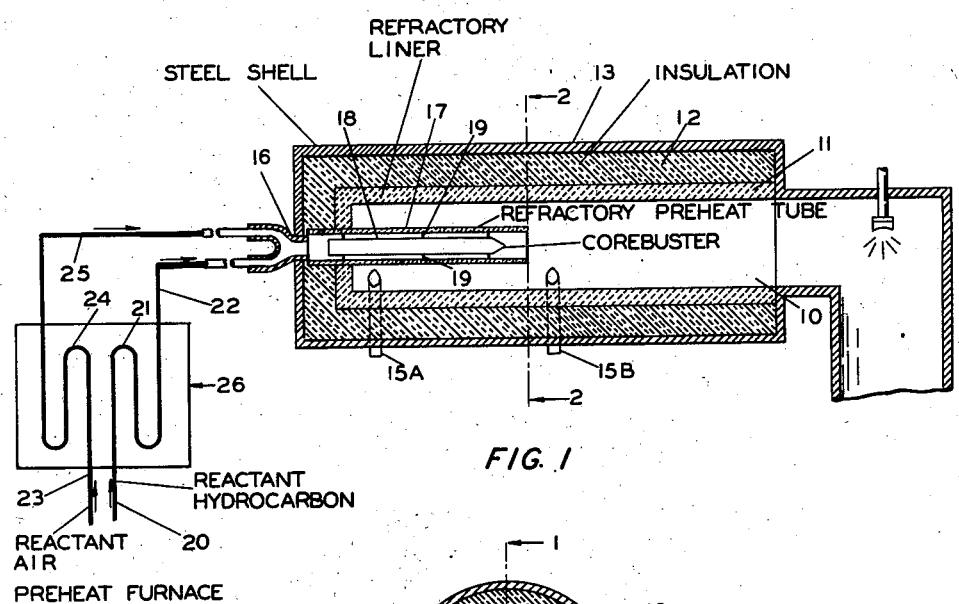
FIG. 1
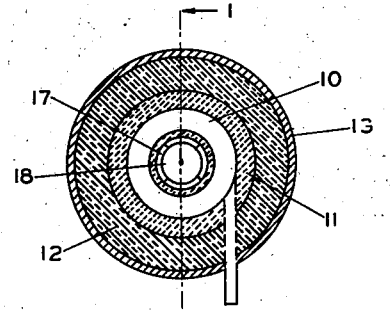
FIG. 5
FIG. 2
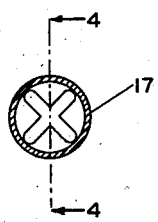
FIG. 3
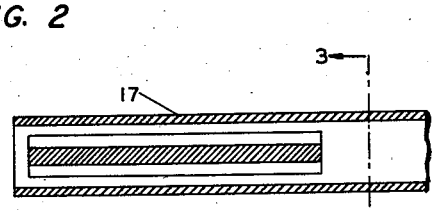
FIG. 4
INVENTOR
J.C. KREJCI
BY Hudson & Young
ATTORNEYS Patented June 12, 1951

2,556,196

UNITED STATES PATENT OFFICE 2,556,196

PROCESS AND APPARATUS FOR PRODUCING CARBON BLACK

Joseph C. Krejci, Phillips, Tex., assignor to Phillips Petroleum Company, a corporation of Delaware Application November 6, 1944, Serial No. 562,114

5 Claims. (Cl. 23—209.8)

This invention relates to the manufacture of carbon black. In one of its more specific aspects it relates to an improvement in the furnace and process of manufacturing carbon black disclosed in my copending application, Serial No. 424,084, filed December 22, 1941, and now issued as Patent No. 2,375,795, of May 15, 1945, of which this application is a continuation-in-part. In this application the invention resides mainly in means for preheating the charge stock to the carbon black producing furnace.

In the production of carbon blacks by the so-called "furnace method" some processes are dependent upon the partial combustion of the furnace charge stock for the heat and temperature required, while in others this heat and temperature is furnished from a separate source. In this latter case the charge stock may be heated within the reaction furnace, or in a seperate preheat furnace, or a combination of these heating means may be employed to advantage.

When all or a major portion of the preheating of a charge stock is carried out in a separate preheating furnace, this unit may be relatively large and must be constructed in such a manner and of such materials as to withstand high temperatures. The fire box must be lined with high temperature refractory brick, the heating tubes may be ordinary steel or may need be alloy steel depending upon preheat requirements.

I have found means and a method for preheating carbon black furnace charge stock without the use of large, expensive preheating furnaces. In addition, my discovery permits increased yield of carbon black per unit of charge stock. The apparatus of my invention may, however, be used in conjunction with a preheat furnace, and with such a combination carbon black yields are further increased. In cases where some of the preheating is by a conventional preheater, such a heater need not be constructed for especially high temperature service and therefore may be made of less expensive materials. Under these several conditions the quality of the carbon black so produced is fully the equivalent of that produced according to my invention, Serial No. 424,084, now Patent No. 2,375,795, and described therein.

This invention comprises mainly a preheating apparatus to be inserted in the inlet end of the carbon black producing furnace. This relatively small preheating apparatus is intended to be used in conjunction with an ordinary preheating furnace or to replace the conventional preheating furnace in its entirety.

An object of this invention is to provide apparatus and a method for the production of carbon black.

Another object of this invention is to provide apparatus and a method for the production of carbon black of quality equivalent to that produced according to the process disclosed in my application, Serial No. 424,084, now Patent No. 2,375,795, but of increased yield per unit of charge stock.

Still another object of my invention is to provide apparatus and a method for the production of carbon black of the quality described in said application without the use of a conventional preheating furnace.

Still other objects and advantages will be apparent to those skilled in the art from a careful study of the following detailed description.

The accompanying diagrammatic drawing is a part of this specification and illustrates apparatus in which the process of my invention may be practiced, in which Figure 1 is a longitudinal section of a preferred form of my reaction chamber taken on the line 1—1 of Figure 2 and showing diagrammatically the apparatus for preheating the charge stock and and its position in the carbon black producing chamber.

Figure 2 is a cross sectional view of a preferred form of apparatus taken on the line 2—2 of Figure 1.

Figure 3 is a cross sectional view taken on the line 3—3 of Figure 4 showing a type of "corebuster" which can be used in my preheating tube.

Figure 4 is a transverse sectional view of the corebuster taken on the line 4—4 of Figure 3.

Figure 5 illustrates diagrammatically a preheat furnace which may be used in conjunction with my reaction chamber preheater.

Like numerals on the figures refer to the same or similar parts. These drawings have been presented in diagrammatic form only, and such conventional and well known parts as valves, flow meters, pressure regulators, temperature measuring devices, etc. which would be used in the production of carbon black, for simplicity have not been shown.

Referring now to the drawing, a cylindrical reaction chamber 10 has a lining 11 of highly refractory material such as sillimanite or Alundum. Between this refractory liner 11 and a cylindrical steel shell 13 is a layer of insulation 12.

The inlet end portion of the cylindrical furnace is equipped with an opening to accommodate a feed stock charge line 16. This line or pipe may terminate just inside the steel shell or at any point such that it may not be exposed to the normally high furnace temperature. By such design this inlet pipe need not be made of expensive alloy steel. Adjacent the end of this inlet pipe is a refractory preheat tube 17. This tube preferably should be made of a highly heat conductive refractory, such as for example, Carborundum. Within this tube may be positioned a "corebuster" 18 to assist in obtaining a high ratio of heat transmitting surface to volume in a tube of large diameter and high throughput. The end of the corebuster may preferably be a few inches upstream of the end of the preheat tube to allow the velocity of the charge stock to drop to a moderate value before it enters the reaction zone of the furnace.

The preheat tube is heated externally by a "helical" flame. An opening or openings 15A and 15B extend through the reaction chamber or furnace side wall in such a manner that the inner terminal has the shape of a somewhat elongated ellipse and gases passing into the furnace through this inlet are discharged in a direction substantially tangential to the inner furnace wall. Since the downstream or discharge end of the reactor is the only opening for discharge of material, this tangential gas follows a helical path from its point of inlet to the outlet end of the furnace. This gas due to its high inlet velocity and resultant centrifugal force maintains a layer or coating on the furnace inner wall to prevent deposition of carbon black. In the normal operation of such a carbon black reactor, which operation was fully described in my above mentioned copending application, the tangential gas may be a combustible mixture of fuel gas and air or under certain conditions may be substantially air alone. In this latter case the tangential air furnishes oxygen for combustion of a portion of the hydrocarbon charge stock while in the former the burning combustible mixture serves as the means for furnishing heat to promote the actual carbon black forming reactions.

According to this invention one tangential burner 15A is located near the inlet end of the reaction chamber and at a point substantially free of reactant hydrocarbons. In order to furnish heat for indirect heat exchange through the wall of the cylindrical preheat tube, a combustible fuel and air mixture is injected or passed into the furnace at this point. It is obvious that the velocity of the incoming combustible mixture must be greater than the rate of flame propagation to prevent premature combustion or even an explosion.

A second tangential burner 15B may be positioned near the outlet end of the preheat tube. Through this burner may be passed a combustible mixture similar to that passed through tube 15A, or air alone may be added. When only air comes in through tube 15B then a portion of the hydrocarbons issuing from the preheat tube is burned to furnish the heat of reaction for the production of carbon black. It is not intended to limit this furnace to the utilization of one or even two tangential burner tubes, but as many as needed may be used to furnish the necessary amount of heat and to furnish the necessary helical blanket of burning gases and combustion products on the chambers inner side wall to prevent deposition of carbon thereon.

The preheat tube 17, as mentioned hereinbefore should preferably be made of a heat conductive refractory material such as Carborundum. The corebuster 18 may also be made of Carborundum, but might if desired be made of other refractory material, such as for example alumina, fused quartz, or sillimanite. The corebuster is an object placed centrally in the preheat tube in such a manner as to reduce the effective cross sectional area of the preheat tube.

Such a preheat tube, as shown in Figure 1, may, for purposes of illustration, be about 4 feet in length and positioned in a 10 foot reactor chamber. The reactor chamber may be about 15 inches inside diameter, the size being such as to handle efficiently reactant gas feed at the rate of about 5000 cubic feet per hour. The preheat tube, as mentioned above, may be about 4 feet in length, and approximately 6 inches inside diameter with a cylindrical corebuster about 5½ inches outside diameter. The corebuster should terminate five or six inches upstream from the discharge end of the preheat tube so as to permit the velocity of the reactant charge stock to drop to a moderate value before it enters the conversion portion of the chamber. The upstream end of the corebuster may be flat across as shown, or may be rounded or even conical in shape similar to that of the downstream end. The downstream end is shown as being conical in shape for purposes of illustration only. It may, if desired, be rounded or flat across. The conical shaped end is intended to cause less turbulence of the reactant hydrocarbons as they enter the reaction zone. The upstream end of the corebuster may be positioned at most any point desired, possibly dependent upon the available length of such a member. It may vary from a few inches within the chamber inlet end wall, to flush with the wall or it may even extend outside the furnace. The corebuster should be made with lugs on its outside surface to assist in maintaining it in a well centered position in the preheat tube in order to make certain that the annular space between the corebuster and preheat tube is of a uniform width, in the case of my illustration this width is approximately ¼ inch.

A corebuster-preheat tube assembly constructed as described heats hydrocarbon residue gas from atmospheric temperature to 1200–1500° F., or if the gas has been previously heated to 1400°–1500° F. it can be further heated to 1800°–2000° F. and cracked to 8–10% olefins.

A second type of corebuster is illustrated in Figures 3 and 4. This corebuster may be made of material similar to the one above described, that is, Carborundum, alumina or other such material as will withstand the high temperatures encountered without melting or softening. The X type member has been found to serve in an excellent manner for preheating hydrocarbon gases for carbon black production in the reactor furnace illustrated and herein described and further described in my copending application, Serial No. 424,084, now Patent No. 2,375,795 hereinbefore referred to.

Other forms of corebusters may be used as long as they give a relatively heating surface-to-volume ratio. The corebuster illustrated in Figures 3 and 4 is such a piece of apparatus, by its shape and form it is self centering and permits free flow of gases being heated. This apparatus is substantially an X in cross section and may be made any length desired, of course dependent upon the heating problem.

The unobstructed cross sectional area of a preheat tube containing an X-shaped corebuster may be greater than one carrying a closed cylindrical corebuster element. There apparently is not or substantially not a "dead space" at the downstream end of the element such as exists at the square end of a cylindrical element. To eliminate this apparent dead space and also to decrease more effectively the velocity of gases being heated I have rounded or made in a conical shape the downstream end of the cylindrical corebuster. By such a shape the stream or current of reactant gases enters the conversion portion of the reactor as a solid cylindrical shaft of substantially uniform composition and rate of flow.

The use of preheaters of any type and especially of the herein disclosed "corebuster" type has many advantages in the manufacture of carbon black by my process.

The heat from the tangential burner 15a becomes more useful when it is transferred from the tangential flame to the reactant hydrocarbon before the two contact each other in the conversion-to-carbon part of the system. An increase in carbon black yield results, particularly when the heat effects a precracking of the reactants to unsaturated hydrocarbons. Also, a preheated hydrocarbon can be converted into carbon black faster than one which is not preheated, and a faster conversion favors the formation of carbon black of smaller particle size and of generally better quality as a reinforcing agent for rubber.

These improvements in yield and quality of carbon black also result when the heat content of the helical flame is reduced by the amount of heat transferred to the reactants through the preheat tube wall. However, in operation, the heat content of the helical flame is not reduced to this extent since in the preheat portion of the furnace the reactant hydrocarbons and tangentially added fuel mixture are kept fully separated and under these conditions the combustion of the latter is more efficient. This increased efficiency results by causing the combustion to take place at least partially before the helical flame contacts the reaction hydrocarbon. This combustion takes place in the annulus surrounding the preheat tube. During this precombustion, the greater proportion of the burning is to $CO_2$ and $H_2O$ rather than CO and $H_2$, than would be the case if the combustible mixture were contacted with the reactant hydrocarbon before any combustion could take place. In the latter case enrichment of the combustible mixture by the reactant hydrocarbon would favor combustion to CO and $H_2$. When considerable precombustion to $CO_2$ and $H_2O$ is effected, it does not revert completely to CO and $H_2$ on mixing with the reactant hydrocarbon because the time is limited and the reaction to CO and $H_2$ is slower than the carbon forming reaction.

To avoid necessity of supports for the preheat tube-corebuster assembly, the reaction chamber can be arranged in a vertical position so that the preheat tube will discharge its contents either vertically upward or downward.

The number of tangential ports (such as 15a and 15b) in the furnace wall will depend upon a number of factors. The greater the diameter of the reactor chamber the greater must be the number of tangential burner ports so as to introduce sufficient fuel gas to prevent deposition of carbon on the chamber walls. At least one tangential inlet or possibly two spaced 180° apart should be positioned near the inlet end of the chamber while one or more should preferably be located near the preheat tube outlet. Depending upon the length of the furnace more or less additional tangential ports may need to be used. The velocity of the fuel gas at the point of inlet into the reactor must be sufficiently great to maintain by centrifugal force a layer of helically moving gases between the central core of reactant gas and the cylindrical wall of the reactor so as to prevent deposition of carbon on the furnace wall. This velocity may be maintained by simply maintaining a sufficiently high pressure on the fuel gas and possibly restricting somewhat the cross sectional area of the tangential openings.

While the particular furnace described herein was 15 inches inside diameter and 10 feet in length, other sizes of furnaces have been used, one of which was 4½ inches in diameter, another was 9½ inches in diameter. Still other sizes of furnaces can be used, the diameters and lengths of which may be varied to meet the specific problems at hand. Furnaces of different diameters and lengths will require different arrangements of tangential inlets, such considerations have been fully disclosed in my copending application previously identified.

The relative size, diameter or width of the annular space between the corebuster and preheat tube, as disclosed was about ¼ inch but it will be obvious to one skilled in such art that this annular space may be varied in size to suit the problem at hand. Smaller furnaces operated with smaller throughputs will of course require smaller preheat tubes and corebusters. Even with smaller preheat tubes and smaller corebusters the effective area of the preheating annular space will be dependent upon the length of corebuster and preheat tube, the amount of preheat of reactant charge desired, and upon other variables.

The process can be modified in various ways including those described in the copending application. Reactant air, cold or preheated, can be passed through the refractory preheat tube in admixture with the reactant hydrocarbon gas, in which case partial combustion of the hydrocarbon gas aids in the preheating and precracking to olefins.

Referring to Figure 5 which illustrates a preheat furnace such as can be used, numeral 20 refers to the reactant hydrocarbon inlet, 21 the reactant heating coil while line 22 conducts the partially heated reactant hydrocarbon to the main preheating unit in the reactor chamber. In like manner, pipe 23 is the inlet of reactant air to a heating coil 24 while the heated air passes through an air line 25 to join the preheated reactant gas in the pipe 16 which conducts the mixture to the refractory preheat tube 17.

In case the preheat furnace 26 is not used then the reactant gas or reactant gas and air mixture passes from sources, not shown, directly by way of the inlet line 16 into the refractory preheat tube 17.

Materials of construction, as for example, preheat furnace tubes in case such are used, reaction chamber insulation and lining, reaction chamber preheat tube and corebuster, may be selected among those items commercially available and best suited by the operating conditions as herein disclosed without departing from the intended scope of my invention.

While the preferred apparatus and method of operation for carrying out my invention are described in this specification, it will be obvious to those skilled in the art that there are many possible variations of the apparatus and methods of operation as may be learned from operating experience and yet remain within the intended spirit and scope of my invention, and limited only by the following claims.

Having described my invention, I claim:

1. A carbon black producing furnace comprising in combination an insulated hollow cylindrical vessel having a closed end, a fuel supply conduit communicating with said vessel through the sidewall at a first point adjacent said closed end and so disposed that its longitudinal axis is tangent to the inner cylindrical wall and in a plane perpendicular to the longitudinal axis of said vessel, a reactant charge supply conduit of refractory material disposed axially in said vessel and extending from said closed end to a point past said first point and in the central portion of said vessel, a solid refractory body disposed coaxially within said charge supply conduit, and extending from said closed end of said vessel to a point short of the end of said supply conduit in the central portion of said vessel and said refractory body having an average outside diameter smaller than the inside diameter of said charge supply conduit to provide space for the passage of said charge.

2. A carbon black producing furnace comprising in combination an insulated hollow cylindrical vessel having a closed end, a fuel supply conduit communicating with said vessel through the sidewall at a first point adjacent said closed end and so disposed that its longitudinal axis is tangent to the inner cylindrical wall and in a plane perpendicular to the longitudinal axis of said vessel, a reactant charge supply conduit of refractory material disposed axially in said vessel and extending from said closed end to a point past said first point and in the central portion of said vessel, a solid refractory body disposed coaxially within said charge supply conduit, and extending from said closed end of said vessel to a point short of the end of said supply conduit in the central portion of said vessel and said refractory body having an average outside diameter smaller than the inside diameter of said charge supply conduit to provide space for the passage of said charge, and a third conduit extending through the sidewall of said vessel into the central portion thereof longitudinally and so disposed that its longitudinal axis is tangent to the inner sidewall and in a plane perpendicular to the longitudinal axis of said vessel.

3. The carbon black producing furnace of claim 2 wherein the solid refractory body is circular in cross section.

4. The carbon black producing furnace of claim 2 wherein said solid refractory body is of an irregular cross section.

5. A process for producing carbon black comprising introducing a combustible mixture of a fuel gas and a combustion supporting gas into a cylindrical heat insulated reaction zone having one end closed, and the other end open, burning said combustible mixture in said zone, said combustible mixture being introduced into said zone at said closed end and in a direction tangent to the sidewalls of said cylindrical reaction zone and in a plane perpendicular to the axis thereof and at such a velocity that said combustible gas mixture and gases produced by said combustion follow a helical path adjacent the cylindrical wall from said closed end to said open end of said zone thereby forming a rotating annulus adjacent said cylindrical wall; introducing an oxygen containing gas into the central portion of said reaction zone and in a direction tangent to the sidewall of said zone and in a plane perpendicular to the axis thereof, said oxygen containing gas being introduced at a sufficiently high velocity as to mix and flow with said rotating annulus adjacent said cylindrical wall; introducing a stream comprising reactant hydrocarbon in the gaseous state axially and at a nonperipheral point into the inlet end of said zone, heating said axially introduced stream of reactant hydrocarbon by conduction and by radiation but out of direct contact with said helically moving burning gases, introducing the so heated reactant hydrocarbon longitudinally into direct contact with said helically moving annulus of flame and combustion products in the central portion of said cylindrical zone and heating said reacting hydrocarbon to a carbon black forming temperature.

JOSEPH C. KREJCI.

REFERENCES CITED

The following references are of record in the file of this patent:

UNITED STATES PATENTS

| Number | Name | Date |
|---|---|---|
| 1,340,902 | Lundgaard | May 25, 1920 |
| 1,477,511 | Martin | Dec. 11, 1923 |
| 1,894,249 | Williams | Jan. 10, 1933 |
| 2,117,968 | Lutherer | May 17, 1938 |
| 2,153,951 | Barber | Apr. 11, 1939 |
| 2,292,355 | Ayers | Aug. 11, 1942 |
| 2,343,866 | Hincke | Mar. 14, 1944 |
| 2,368,827 | Hanson et al. | Feb. 6, 1945 |
| 2,375,795 | Krejci | May 15, 1945 |
| 2,440,423 | Wiegand et al. | Apr. 27, 1948 |